United States Patent [19]

McGhee

[11] 3,795,825

[45] Mar. 5, 1974

[54] AUTOMATIC GAIN COMPENSATION CIRCUIT

[75] Inventor: John D. McGhee, Plymouth Meeting, Pa.

[73] Assignee: E. I. du Pont de Nemours and Company, Wilmington, Del.

[22] Filed: Feb. 28, 1973

[21] Appl. No.: 336,767

[52] U.S. Cl. .................................. 307/264, 328/168

[51] Int. Cl. .............................................. H03k 1/14

[58] Field of Search ... 307/205, 251, 279, 304, 264, 307/235; 328/168

[56] References Cited

UNITED STATES PATENTS

| | | | |
|---|---|---|---|
| 3,392,289 | 7/1968 | Ehni | 307/264 |
| 3,626,211 | 12/1971 | Formeister | 307/264 |
| 3,713,034 | 1/1973 | Schwartz | 307/264 |

*Primary Examiner*—John S. Heyman
*Assistant Examiner*—Ro E. Hart

[57] ABSTRACT

A compensating circuit for automatically varying the gain of an electrical system as a continuous function of an independent driven signal is disclosed. The circuit comprises a plurality of resistances, connected in parallel across a current source. The resistances are switched into the circuit by FET switches which are in turn controlled by switch driver transistors. By combining the driven signal with a periodic signal to form a composite signal used to activate the switch driven transistors, a smooth curve can be obtained.

9 Claims, 4 Drawing Figures

AUTOMATIC GAIN COMPENSATION CIRCUIT

BACKGROUND OF THE INVENTION

This invention relates to electrical circuits. In particular, it relates to a compensating circuit useful for automatically varing the gain of an electrical system as a continuous function of an independent driven signal.

In many applications, it is necessary to automatically vary the gain of an electrical system as a function of some independent variable. Such is the case, for example, in differential scanning calorimetry (DSC) where a sample contained in a sample receptacle is subjected to a gradual increase (or decrease) in temperature, and transitions in the sample, which occur at various temperatures, are monitored by measuring the amount of heat generated by the sample as a function of temperature. Such measurements are generally made using a thermocouple either embedded in the sample or the receptacle. The latter provides a more sensitive measurement, but it happens that the thermal resistance of such a system is not a linear function of temperature. The change in thermal resistance as a function of temperature can introduce an error in the measurement unless some means is provided to compensate for the nonlinearity of the DSC cell. This can be done by introducing some means in the measurement circuit which operates to automatically vary the gain of the system, as a function of temperature, to counteract the nonlinear characteristics of the calorimeter cell.

In the particular case mentioned above, and in many other cases, it is desired that the change in gain is a continuous function of the independent variable.

SUMMARY OF THE INVENTION

The present invention provides a compensating circuit for automatically varying the gain of an electrical system as a continuous function of an independent driven signal comprising, in combination:

a. a plurality of solid state switches;

b. a plurality of resistances, each associated with a solid state switch to form a switchable shunt resistance, each switchable shunt resistance being connected in parallel with every other switchable shunt resistance to form a shunt resistance bank, the effective resistance of which is determined by the number of solid state switches which are conductive;

c. means to supply current to the shunt resistance bank to produce the output signal;

d. a plurality of solid state switch drivers, each associated with a solid state switch for controlling the conductivity of the solid state switches and thereby the effective resistance of the shunt bank, and each biased to become conductive when a different potential is applied to its control lead;

e. an input for the driven signal;

f. means to generate a periodic signal;

g. means to add the driven signal and the periodic signal to form a composite signal; and h. means to apply the composite signal to the control leads of each of the solid state switch drivers.

In the preferred embodiment, the solid state switches are FET switches and the solid state switch drives are transistors. The means to generate a periodic signal can be a multivibrator in combination with an integrating circuit, or any other suitable means. The means to add the driven signal and the periodic signal can be an operational amplifier, connected as a voltage follower. Use of the operational amplifier provides a convenient means to isolate the periodic signal from the driven signal, but any other suitable means can be used.

To insure that the function generated by the present invention is a continuous function, in the preferred embodiment, at least one of the switch driver transistors is biased to begin conducting when the top of the periodic portion of the composite signal exceeds a certain activation value, and each successive switch driver transistor is biased to begin conducting when the bottom of the periodic portion of the composite signal exceeds the activation value of the preceding switch driver transistors.

In the simplest case, the desired gain is a monotonically increasing function of the independent variable. In some circumstances, however, the function can be a complex function. The present invention contemplates a circuit which can vary the gain of an electrical circuit in a complex manner by providing means to initially render at least one of the FET switches nonconductive and means to render this nonconductive FET switch conductive when the first of the switch driver transistors begin to conduct. This will produce a monotonically decreasing curve. To provide a region in which the gain is essentially constant, the shunt resistance associated with one or more switches can be made large or even omitted altogether to provide an infinite resistance.

BRIEF DESCRIPTION OF THE DRAWINGS

The present invention can best be understood with reference to the following figures in which.

DETAILED DESCRIPTION OF THE DRAWINGS

Figure 1:
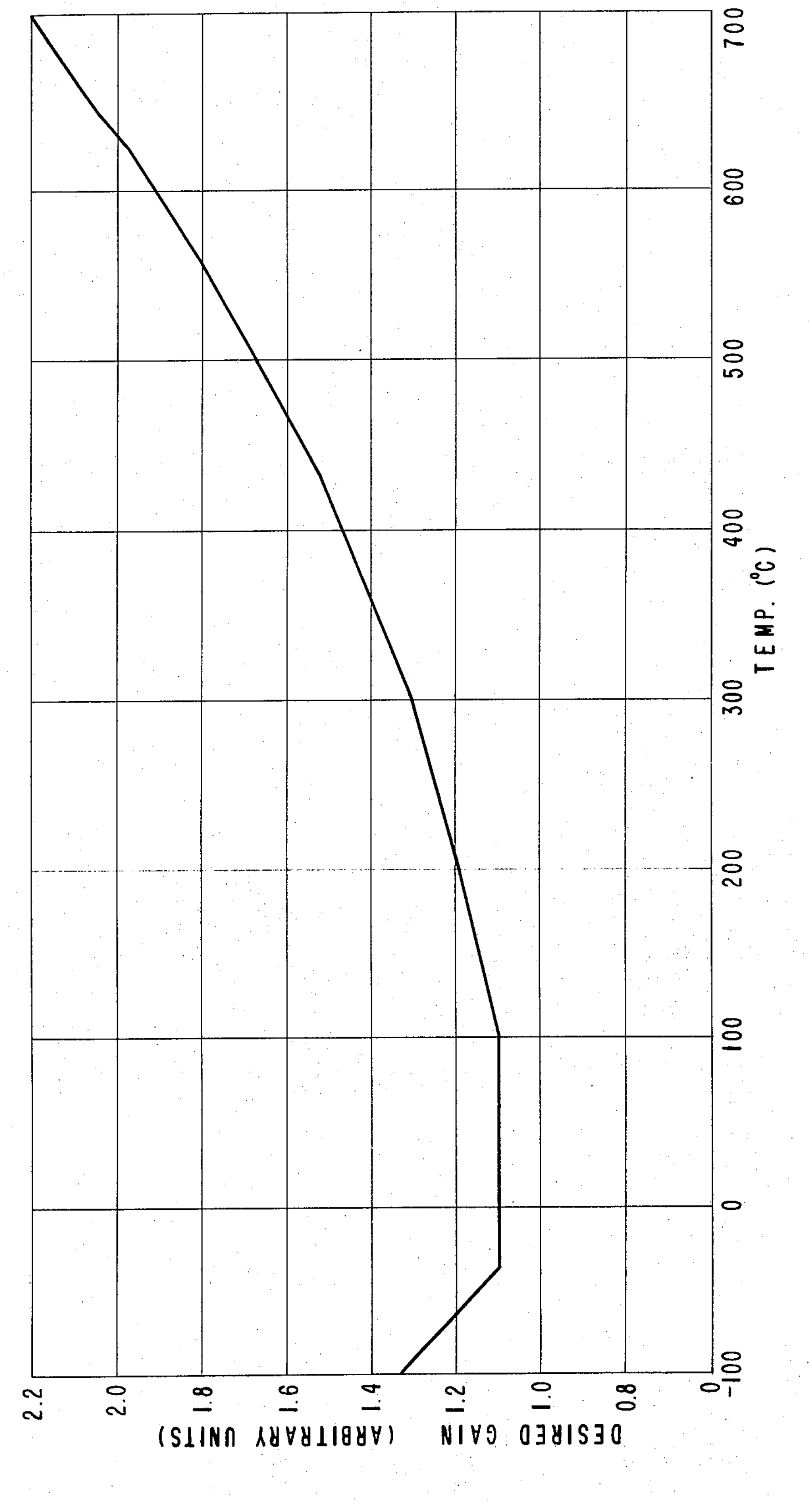
FIG. 1 is a plot of the desired gain versus an independent variable which in this case is a signal equivalent to temperature.
Figures 2, 4:
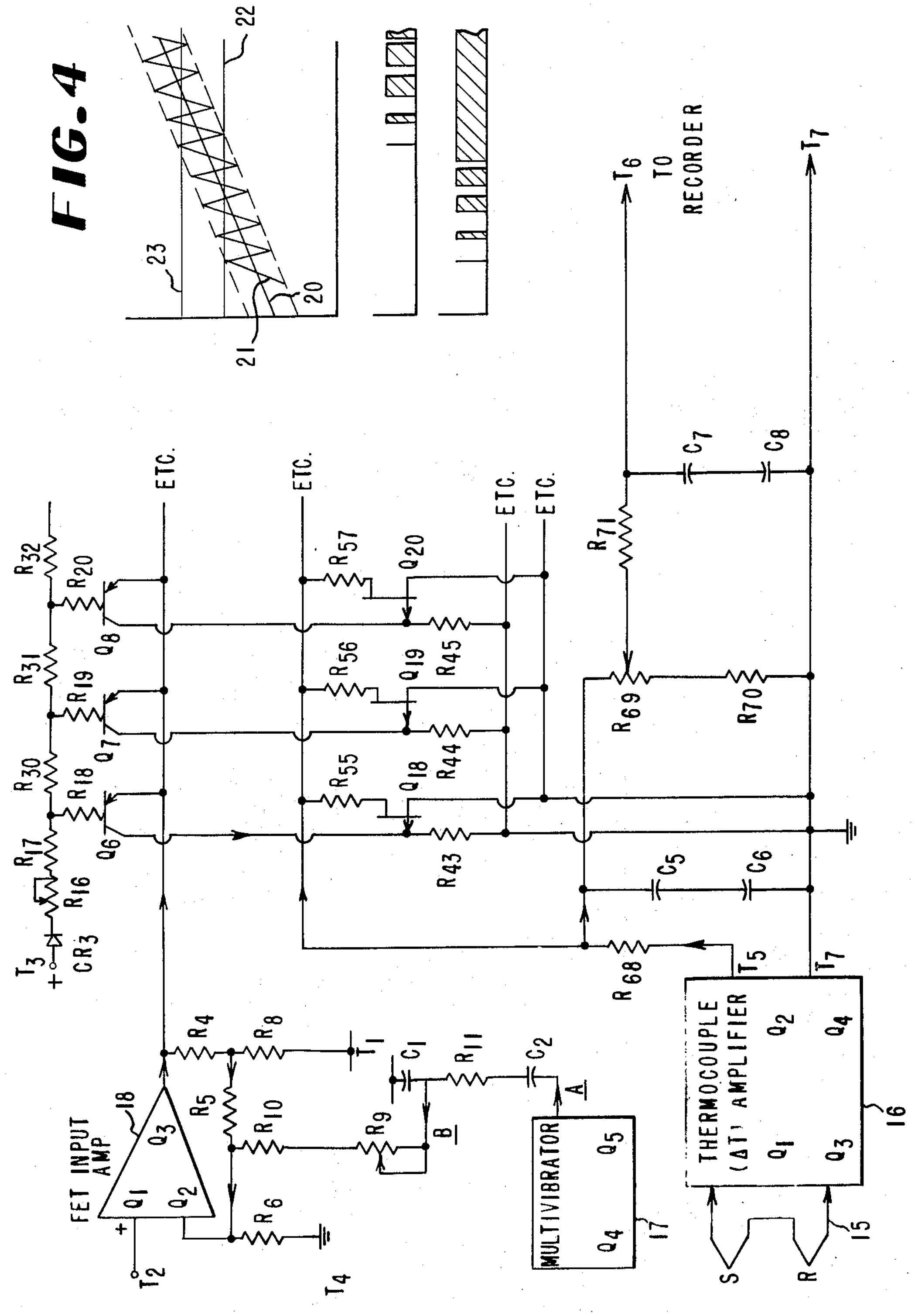
FIG. 2 is a simplified schematic diagram of one embodiment of the present invention which is connected to the output of a thermocouple amplifier to alter the gain of the system.
FIG. 4 is a series of plots showing how the driven set point signal is used to generate a variable voltage input to the bank of switches used to vary the resistance applied across the thermocouple amplifier.
Figure 3:
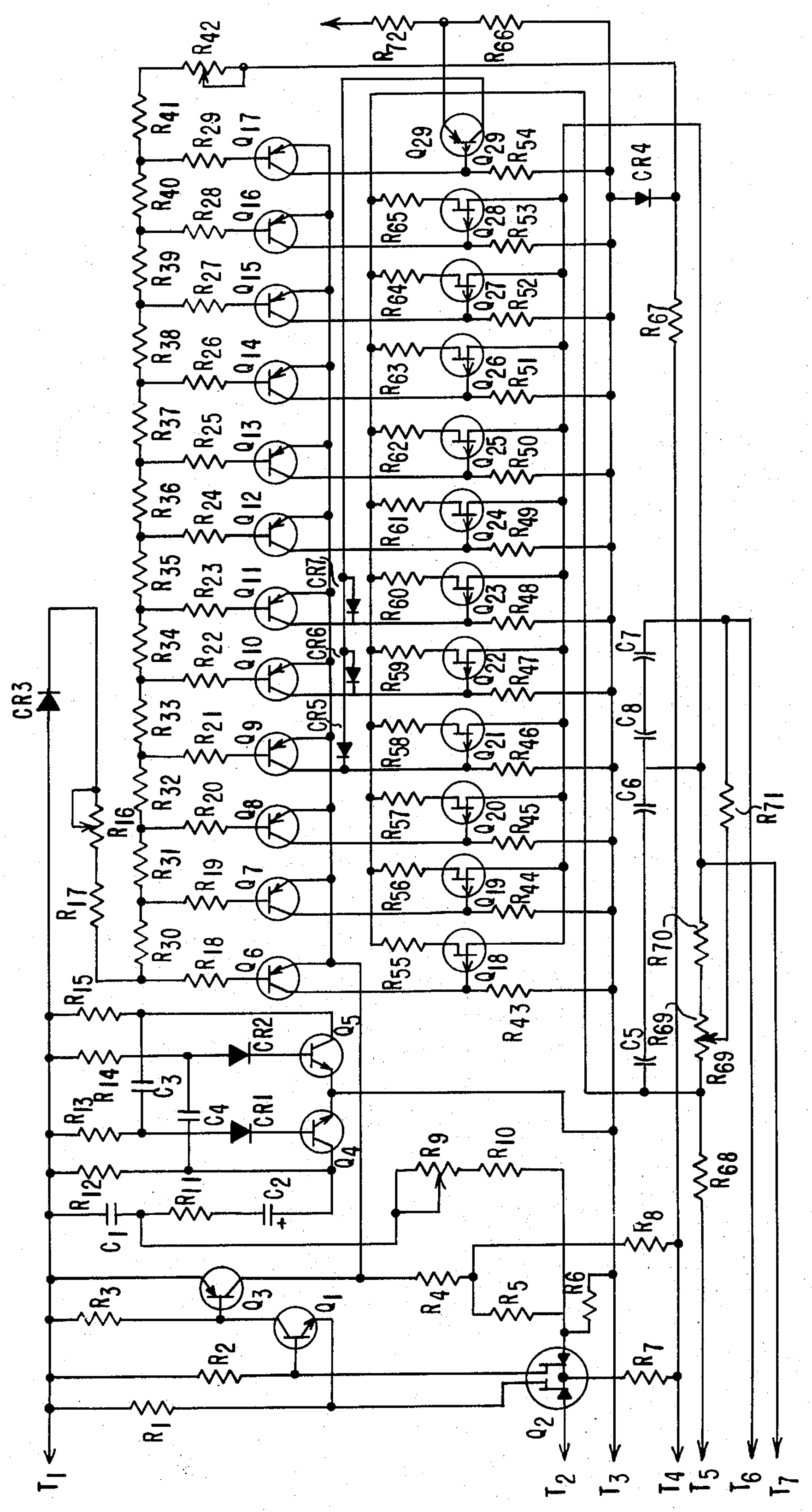
FIG. 3 is a detailed circuit diagram of a circuit which can be used to generate the curve shown in FIG. 1.

FIGS. 2 and 3 illustrate the same embodiment of the invention. FIG. 3 is a detailed electrical circuit diagram of the circuit used to produce the gain curve shown in FIG. 1; FIG. 2 is a simplified version which will be used to describe the invention. The numerical description of the elements is the same.

In FIG. 2, a differential thermocouple 15, with a sample junction S and a reference junction R, is connected to a differential amplifier 16. This amplifier which is composed of $Q_1$, $Q_2$, $Q_3$ and $Q_4$ and is of conventional design, is used to amplify the voltage generated by differential thermocouple 15 due to the difference in temperature at the sample and reference junctions. This voltage is applied to the recorder through terminals $T_6$ and $T_7$. Capacitors $C_5$, $C_6$, $C_7$ and $C_8$ are used to average the signal, and potentiometer $R_{69}$ is used to calibrate the system by setting the gain, at some temperature, to the proper value.

If the output of the cell in which the thermocouple leads 15 are embedded did not vary as a function of temperature, the circuit described would be all that is necessary to record the heat generated by the change in state which occurred at a particular temperature. In actual practice, however, the output of the DSC cell varies as a function of temperature. The remaining circuitry in FIGS. 2 and 3 is used to compensate for nonlinearity in the system. This nonlinearity is caused by the fact that the sensitivity of the DSC cell is a function of temperature. It varies, as a function of temperature, because the thermocouple EMF per degree, the thermal conductivity of the metal from which the cell is made, and the thermal loss by radiation and convection all vary as a function of temperature. If the sensitivity of the system is to be made constant, then, the compensating circuit must be designed so that the gain of the system will vary as a function of temperature in a manner such as to offset the change in sensitivity of the DSC cell as a function of temperature. The curve shown in FIG. 1 is the desired gain of the system, plotted against an independent variable, which in this instance is temperature. The invention will be discussed, hereafter, in terms of a system to generate the curve shown in FIG. 1. It is to be understood, however, that the invention can be used to generate a variety of curves regardless of what the curve represents.

To produce the gain shown in FIG. 1, the additional elements shown in FIG. 2 are provided. First some means is provided to generate a periodic function. In the embodiment illustrated, this is a conventional multivibrator, 17, which is composed of $Q_4$ and $Q_5$ and is used to generate a square wave at point A. Resistor $R_{11}$ and capacitors $C_1$ and $C_2$ then convert the square wave to a triangular wave at point B.

A conventional operational amplifier, which is designated as FET input amplifier 18, and is composed of $Q_1$, $Q_2$ and $Q_3$, is provided. The triangular wave from point B is applied to operational amplifier 18 through resistors $R_9$ and $R_{10}$. Resistor $R_9$ is used to set the peak to peak voltage of the triangle. A signal, referred to as the driven set point signal is also applied to the operational amplifier through terminal $T_2$. This driven set point signal corresponds to the independent variable used to generate the curve. In the present case, it is a linear ramp signal proportional to the temperature. Resistors $R_4$ and $R_5$ provide a feedback loop for the operational amplifier which, due to its ability to isolate the two input signals, provides a convenient means to add the periodic function and the driver signal to form a composite signal.

This operational amplifier operates as a voltage follower which is biased through feedback resistors $R_4$ and $R_8$ by a negative voltage applied to terminal $T_1$. In a voltage follower, the output voltage is identical to the input voltage, which in the present case is the sum of the driven set point signal and the triangular wave of point B. For the purpose of the following discussion, we will assume that the set point is set at some positive voltage and driven more positive to form a ramp signal, such as that shown as line 20 on FIG. 4. A triangular wave is superimposed on ramp 20 to generate a composite signal 21.

FET's $Q_{18}$, $Q_{19}$ and $Q_{20}$ in FIG. 2 ($Q_{18}$ through $Q_{28}$ in FIG. 3) constitute a bank of switches. Transistors $Q_6$, $Q_7$ andd $Q_8$ in FIG. 2 ($Q_6$ through $Q_{17}$ in FIG. 3) constitute a bank of switch drivers. These p-n-p transisors are biased positively so that they are normally nonconductive. A positive voltage is applied to terminal $T_3$ through temperature compensating diode CR3, voltage divider $R_{16}$ and resistor $R_{17}$. Resistors $R_{18}$, $R_{19}$ and $R_{20}$ in FIG. 2 ($R_{18}$ through $R_{29}$ in FIG. 3) are all equal. The same is true for resistors $R_{30}$, $R_{31}$ and $R_{32}$ in FIG. 2 ($R_{30}$ through $R_{41}$ in FIG. 3). This means that transistor $Q_6$ has a higher positive bias applied to its base than $Q_7$, and so on down the line through $Q_7$ and $Q_8$ to $Q_{17}$. The emitters of each of these transistors are connected to the output of FET input amplifier 18. As the output of this operational amplifier increases, each of the transistors in the bank of switch dirves will begin to conduct in turn. Transistor 17 will begin to conduct first, right on down the line through transistor $Q_8$ and $Q_7$ to transistor $Q_6$.

Composite signal 21 in FIG. 4 represents the output of the FET input amplifier 18. Assuming that the transistor biasing resistances are chosen so that the first transistor to conduct (transistors $Q_8$ in FIG. 2 or transistor $Q_{17}$ in FIG. 3) will conduct when the voltage applied to the emitter reaches a certain activation value, indicated by line 22 in FIG. 4, then the first transistor will conduct for only that period of time when the composite signal 21 of FIG. 4 is above line 22. At first this is for only a short part of the triangular cycle, but as the ramp voltage increases the portion of the triangular cycle during which the transistor conducts will increase until it is on continuously. This can be seen from the lower box graph in FIG. 4. Line 23 in FIG. 4 represents the voltage level at which the second transistor will begin to conduct. The bias resistors are chosen so that when the first transistor turns on continuously, the second transistor to conduct will begin to conduct for a portion of the triangular cycle. This can be seen from the upper box graph in FIG. 4. Each of the transistors in the bank of switch driver transistor will begin to conduct in turn. The last to conduct will be $Q_6$. The initial intermittant conductivity of the switch drivers coupled with the averaging effect of capacitors $C_5$ through $C_8$ contributes to the continuous nature of the curve.

The bank of transistors $Q_6$ through $Q_{17}$ act as drivers for FET switches $Q_{18}$ through $Q_{28}$ and transistor switch $Q_{29}$. These FET switches are conductive until the proper biasing voltage is applied to the gate. In the embodiment illustrated, the FET's are conductive if 0 voltage is applied to the gate and they become nonconductive if the gate is pulled positive. The FET's are biased through resistors $R_{43}$ to $R_{54}$ so that they are normally conductive and the whole bank of shunt resistors $R_{55}$ through $R_{65}$ are disposed in parallel with $R_{69}$ and $R_{70}$ across the outputs of the thermocouple amplifier. As each transistor begins to conduct, the potential applied to the FET gate associated with it is such that the FET ceases to conduct for that fraction of the cycle during which the transistor conducts. As the ramp signal supplied to terminal $T_2$ is increased, the number of shunt resistors is decreased so that the effective resistance across the thermocouple amplifier is decreased and the signal to the recorder is increased in accordance with the left hand side of the curve shown in FIG. 1 (for 100° to 700°C.)

As far as it goes, FIG. 2 is identical to FIG. 3. FIG. 3, however, is a complete circuit diagram of the circuit used to produce the curve shown in FIG. 1. The values of all of the resistances and capacitors is given in Table I. The solid state devices are identified in Table II and the voltages or connections of the terminals is given in Table III.

FIG. 1 has, in addition to the steadily increasing portion (100° to 700°C.), a steadily decreasing portion (−100° to −40°C.) and a flat portion (−40° to 100°C). Transistor $Q_{29}$ and diodes CR5, CR6 and CR7 are used to produce the steadily decreasing portion of the curve. Transistor $Q_{29}$ is an inverter, which is normally conductive. It supplied a potential, via diodes CR5, CR6 and CR7 to FET's $Q_{21}$, $Q_{22}$ and $Q_{23}$, respectively. These FET's are, therefore, initially nonconductive, and shunt resistors $R_{58}$ through $R_{60}$ are absent from the bank of shunt resistors normally across the thermocouple amplifier 16. As drive transistor $Q_{17}$ begins to conduct, transistor $Q_{29}$ ceases to conduct and FET's $Q_{21}$ through $Q_{23}$ begin to conduct so that resistors $R_{58}$ through $R_{60}$ are introduced

TABLE I

RESISTORS

| Designation | Value (kilohms) | DESIGNATION | Value (kilohms) |
|---|---|---|---|
| $R_1$ | 22 | $R_{42}$ | 1,000 |
| $R_2$ | 19 | $R_{44}$-$R_{54}$ | 1,000 |
| $R_3$ | 51 | $R_{55}$ | 102 |
| $R_4$ | 5 | $R_{56}$ | 89 |
| $R_5$ | 60 | $R_{57}$ | 85 |
| $R_6$ | 205 | $R_{58}$ | 75 |
| $R_7$ | 22 | $R_{59}$ | 77 |
| $R_8$ | 9 | $R_{60}$ | 77 |
| $R_9$ | 200 | $R_{61}$ | 87 |
| $R_{10}$ | 487 | $R_{62}$ | 93 |
| $R_{11}$ | 221 | $R_{63}$ | 97 |
| $R_{12}$ | 82 | $R_{64}$ | 10,000 |
| $R_{13}$ | 1,000 | $R_{65}$ | 10,000 |
| $R_{14}$ | 1,600 | $R_{66}$ | 7 |
| $R_{15}$ | 82 | $R_{67}$ | 1 |
| $R_{16}$ | 100 | $R_{68}$ | 10 |
| $R_{17}$ | 47 | $R_{69}$ | 50 |
| $R_{18}$–$R_{29}$ | 100 | $R_{70}$ | 68 |
| $R_{30}$–$R_{40}$ | 72 | $R_{71}$ | 20 |
| $R_{42}$ | 200 | $R_{72}$ | 8 |

CAPACITORS

| Designation | Value (mfd) | DesignatiOn | Value (mfd) |
|---|---|---|---|
| $C_1$ | 0.22 | $C_5$ | 10.0 |
| $C_2$ | 1.0 | $C_6$ | 10.0 |
| C | 0.01 | $C_7$ | 4.7 |
| $C_4$ | 0.01 | $C_8$ | 4.7 |

TABLE II

TRANSISTORS

| Designation | Type | Designation | TYPE |
|---|---|---|---|
| $Q_1$ | 2N3707 | $Q_5$ | 2N3704 |
| $Q_2$ | T1S69 | $Q_6$–$Q_{17}$ | 2N4058 |
| $Q_3$ | 2N3702 | $Q_{18}$–$Q_{28}$ | 2N5461 |
| $Q_4$ | 2N3711 | $Q_{29}$ | 2N4058 |

DIODES

| Designation | Type |
|---|---|
| CR1 – CR7 | 1N457 |

TABLE III

TERMINALS

| Terminal | Voltage | Terminal | Voltage |
|---|---|---|---|
| $T_1$ | minus | $T_5$ | |
| $T_2$ | drive set point | $T_6$ | recorder input |
| $T_3$ | +15 | $T_7$ | GND |
| $T_4$ | GND | | |

into the shunt bank. This gradually decreases the resistance to its lowest value, at the point on the driven input applied to terminal $T_2$ corresponding to −40°C. To provide the flat portion of the curve between −40° and 100°C., the value of the shunt resistance is chosen to be large, so that the slope of the curve is negligible. After that, the shunt resistance $R_{55}$ through $R_{65}$ are removed from the shunt bank as described above.

While the above discussion has been limited to the situation when the driven set point signal is a linearly increasing ramp, the present invention can be used with a linearly decreasing signal or virtually any type of varying signal. It should also be noted that the present invention can be used to provide a gain curve of virtually any shape bY varying the number of FET switches and the size of the various shunt resistors and biasing resistors.

What is claimed is:

1. A compensating circuit for automatically varying the gain of an electrical circuit as a continuous function of an independent driven signal comprising, in combination:

a. a plurality of solid state switches;

b. a plurality of resistances, each associated with a solid state switch to form a switchable shunt resistance, each switchable shunt resistance being connected in parallel with every other switchable shunt resistance to form a shunt resistance bank, the effective resistance of which is determined by the number of solid state switches which are conductive;

c. means to supply current to said shunt resistance bank to produce said output signal;

d. a plurality of solid state switch drivers, each associated with a solid state switch for controlling the conductivity of the solid state switches and thereby the effective resistance of said shunt bank, and each biased to become conductive when a different potential is applied to its control lead;

e. an input for said driven signal;

f. means to generate a periodic signal;

g. means to add said driven signal and said periodic signal to form a composite signal; and h. means to apply said composite signal to the control leads of each of said solid state switch drivers.

2. The circuit of claim 1 wherein said solid state switches are FET switches.

3. The circuit of claim 1 wherein said solid state switches are FET switches and said solid state switch drivers are transistors.

4. The circuit of claim 3 wherein said means to add said driven signal and said periodic signal is an operational amplifier connected as a voltage follower.

5. The circuit of claim 4 wherein said means to generate a periodic signal is a multivibrator in combination with an integrating circuit.

6. The circuit of claim 3 wherein one of said switch driver transistors is biased to begin conducting when the top of the periodic portion of said composite signal exceeds a certain activation value, and each successive switch driver transistor is biased to begin conducting when the bottom of the periodic portion of said composite signal exceeds the activation value of the preceding switch driver transistor.

7. The circuit of claim 3 wherein said FET switches are biased so that they are normally conducting, thereby providing the lowest effective shunt resistance, and become nonconductive to increase the effective shunt resistance when the switch driver transistors begin to conduct.

8. The circuit of claim 7 further comprising means to initially render at least one of said FET switches nonconductive and means to render this nonconductive FET switch conductive when the first of said switch driver transistor begins to conduct.

9. A compensating circuit for automatically varying the gain of an electrical circuit as a continuous function of an independent driven signal comprising, in combination:

a. a plurality of normally conductive FET switches;
b. a plurality of resistances, each associated with one of said FET switches to form a switchable shunt resistance, each switchable shunt resistance being connected in parallel with every other switchable shunt resistance to form a shunt resistance bank, the effective resistance of which is determined by the number of switches which are conductive;
d. means to supply current to said shunt resistance bank to produce said output signal;
e. a plurality of switch driver transistors, each associated with a switch for controlling the conductivity of the switch and thereby the effective resistance of said shunt bank, and each biased to become conductive when a different potential is applied to its control lead;
f. in input for said driven signal;
g. a multivibrator to generate a triangular signal;
h. an operational amplifier connected as a voltage follower to add said driven signal and said triangular signal to form a composite signal;
i. means to apply said composite signal to the activation leads of each of said switch driver transistors, the first of said switch driver transistor being biased to begin conditioning when the top of the periodic portion of said composite signal exceeds a certain activation value; and
j. means to initially render at least one of said FET switches nonconductive and to render this nonconductive FET switch conductive when the first switch driver transistor begins to conduct, thereby gradually increasing the effective resistance of said shunt bank until the nonconductive FET switch becomes fully conductive, and each successive switch driver transistor being biased to begin conducting when the bottom of the periodic portion of said composite signal exceeds the activation value of the preceding switch driver transistor.

* * * * *